US009836914B2

(12) United States Patent
Reynolds et al.

(10) Patent No.: US 9,836,914 B2
(45) Date of Patent: *Dec. 5, 2017

(54) GAMING SYSTEM AND A METHOD OF GAMING

(71) Applicant: ARISTOCRAT TECHNOLOGIES AUSTRALIA PTY LIMITED, North Ryde, NSW (AU)

(72) Inventors: Christopher Reynolds, Las Vegas, NV (US); Scott Sims, Las Vegas, NV (US)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,525

(22) Filed: Nov. 21, 2016

(65) Prior Publication Data

US 2017/0076539 A1 Mar. 16, 2017

Related U.S. Application Data

(63) Continuation of application No. 13/951,197, filed on Jul. 25, 2013, now Pat. No. 9,501,906, which is a (Continued)

(51) Int. Cl.

*G06F 19/00* (2011.01)
*G07F 17/32* (2006.01)
*G07F 17/34* (2006.01)

(52) U.S. Cl.

CPC ...... *G07F 17/3213* (2013.01); *G07F 17/3244* (2013.01); *G07F 17/34* (2013.01)

(58) Field of Classification Search

None

See application file for complete search history.

(56) References Cited

U.S. PATENT DOCUMENTS

| | | | |
|---|---|---|---|
| 3,757,101 | A | 9/1973 | Semotan |
| 5,184,881 | A | 2/1993 | Karpen |

(Continued)

FOREIGN PATENT DOCUMENTS

| | | |
|---|---|---|
| AU | 2003246036 | 4/2004 |
| AU | 2004203045 | 7/2004 |

(Continued)

OTHER PUBLICATIONS

International Search Report and Written Opinion dated Nov. 17, 2008, corresponding to International Application No. PCT/IB2007/053939.

(Continued)

*Primary Examiner* — Paul A D'Agostino

(74) *Attorney, Agent, or Firm* — McAndrews, Held & Malloy, Ltd.

(57) ABSTRACT

A gaming system is disclosed which comprises a plurality of display positions disposed in a display area, a symbol selector arranged to select a plurality of symbols for display at respective display positions, and an outcome evaluator arranged to determine whether the selected symbols correspond to a winning outcome with reference to at least one of a plurality of defined win lines. Each of the defined win lines comprises at least one display position, and at least some of the win lines comprise differing numbers of display positions. A corresponding method of gaming is also disclosed.

17 Claims, 9 Drawing Sheets

Related U.S. Application Data continuation of application No. 13/556,457, filed on Jul. 24, 2012, now Pat. No. 8,512,126, which is a continuation of application No. 12/435,035, filed on May 4, 2009, now Pat. No. 8,251,796.

(60) Provisional application No. 61/050,032, filed on May 2, 2008.

(56) References Cited

U.S. PATENT DOCUMENTS

| | | | | |
|---|---|---|---|---|
| 5,868,619 | A * | 2/1999 | Wood | G07F 17/3244 273/292 |
| 6,241,607 | B1 | 6/2001 | Payne et al. | |
| 6,251,013 | B1 | 6/2001 | Bennett | |
| 6,261,178 | B1 * | 7/2001 | Bennett | G07F 17/34 273/138.2 |
| 6,394,900 | B1 | 5/2002 | McGlone et al. | |
| 6,551,187 | B1 | 4/2003 | Jaffe | |
| 2001/0031658 | A1 | 10/2001 | Ozaki et al. | |
| 2002/0025846 | A1 | 2/2002 | Bennett | |
| 2002/0039920 | A1 | 4/2002 | Bryant | |
| 2003/0157980 | A1 | 8/2003 | Loose et al. | |
| 2004/0053699 | A1 | 3/2004 | Rasmussen et al. | |
| 2004/0254015 | A1 * | 12/2004 | Nozaki | G07F 17/3211 463/31 |
| 2006/0068880 | A1 * | 3/2006 | Cannon | G07F 17/3244 463/18 |
| 2006/0068881 | A1 | 3/2006 | Casey | |
| 2007/0021187 | A1 | 1/2007 | Gauselmann | |
| 2007/0123338 | A1 | 5/2007 | Sato | |
| 2008/0274788 | A1 * | 11/2008 | Wilson | G07F 17/3244 463/20 |
| 2009/0036195 | A1 | 2/2009 | Stewart et al. | |
| 2009/0111558 | A1 * | 4/2009 | Nakamura | G07F 17/34 463/20 |
| 2009/0124332 | A1 | 5/2009 | Baerlocher | |
| 2010/0041464 | A1 | 2/2010 | Arezina | |
| 2011/0244942 | A1 * | 10/2011 | Aoki | G07F 17/34 463/20 |
| 2013/0102375 | A1 * | 4/2013 | Aoki | G07F 17/32 463/20 |
| 2013/0324213 | A1 * | 12/2013 | Aoki | G07F 17/326 463/20 |
| 2014/0024429 | A1 * | 1/2014 | Aoki | G07F 17/326 463/20 |

FOREIGN PATENT DOCUMENTS

| | | | |
|---|---|---|---|
| AU | 2005218025 | | 4/2006 |
| AU | 2006202210 | | 6/2006 |
| AU | 2006202644 | | 1/2007 |
| AU | 2002301067 | | 6/2007 |
| CA | 2399923 | | 3/2003 |
| CA | 2441081 | | 5/2004 |
| EP | 1063622 | | 12/2000 |
| EP | 1150261 | | 10/2001 |
| EP | 1260928 | A2 | 11/2002 |
| EP | 1418553 | | 5/2004 |
| EP | 1531436 | A2 | 5/2005 |
| EP | 1557803 | A2 | 7/2005 |
| GB | 2200779 | | 8/1988 |
| GB | 2356483 | | 5/2001 |
| GB | 2401705 | | 11/2004 |
| GB | 2402256 | | 12/2004 |
| WO | 2005086018 | | 9/2005 |
| WO | 2008044161 | | 4/2008 |

OTHER PUBLICATIONS

International Search Report and Written Opinion dated Jun. 4, 2008, corresponding to International Application No. PCT/US2007/075202.

* cited by examiner

GAMING SYSTEM AND A METHOD OF GAMING

RELATED APPLICATIONS

This application is a continuation of U.S. patent application Ser. No. 13/951,197 having a filing date of Jul. 25, 2013, which is a continuation of U.S. patent application Ser. No. 13/556,457 having a filing date of Jul. 24, 2012, now issued as U.S. Pat. No. 8,512,126, which is a continuation of U.S. patent application Ser. No. 12/435,035 having a filing date of May 4, 2009, now issued as U.S. Pat. No. 8,251,796, which claims priority to U.S. Provisional Patent Application No. 61/050,032 having a filing date of May 2, 2008. Each of the above-referenced applications are hereby incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system and to a method of gaming.

It is known to provide a gaming system which comprises a game controller arranged to randomly display several symbols from a predetermined set of symbols and to determine a game outcome such as a game win based on the displayed symbols. In some arrangements, a win outcome is defined on the basis of occurrence of symbols along defined win lines which may be preselected or selected by a player prior to display of symbols by the gaming system.

Such gaming systems may commonly be implemented as a stepper machine provided with reels with each reel carrying several symbols of the set, or a video machine wherein selected symbols are displayed on virtual reels on a graphical display device.

However, while such gaming systems provide users with enjoyment, a need exists for alternative gaming systems in order to maintain or increase player enjoyment.

BRIEF SUMMARY OF THE INVENTION

In accordance with a first aspect of the present invention, there is provided a gaming system comprising:

a plurality of display positions disposed in a display area;

a symbol selector arranged to select a plurality of symbols for display at respective display positions;

an outcome evaluator arranged to determine whether the selected symbols correspond to a winning outcome with reference to at least one of a plurality of defined win lines;

wherein each of the defined win lines comprises at least one display position, and at least some of the win lines comprise differing numbers of display positions.

In one embodiment, the display positions define a display area of generally diamond shaped configuration. The diamond shape may be regular or irregular.

In one embodiment, the display positions define a display area of generally square or rectangular configuration.

In one embodiment, the display positions and selected symbols are displayed using a video display.

In an alternative embodiment, the gaming system comprises a plurality of physical reels, each reel having an associated set of symbols, and the gaming system being arranged such that at least one symbol from each reel is viewable through the display area. The physical reels may be disposed so as to be rotatable about an inclined axis, for example about an axis disposed approximately 45° relative to horizontal.

The gaming system may be arranged to operate in normal game mode wherein at least one base game is implemented and special game mode wherein at least one feature game is implemented.

The gaming system may be arranged to commence special game mode when a specific game outcome occurs. In addition or alternatively, the gaming system may be arranged to commence special game mode on the basis of a game event occurring during a game such as display of a particular symbol, in response to player input, based on the amount or type of bet placed, or when a special game is purchased by a player.

The gaming system may be implemented as a stand alone gaming machine or across a network.

In one embodiment, one or more of the symbol selector, feature implementer, prize allocator and the outcome evaluator is constituted, at least in part, by a processor executing program code stored in a memory.

In one embodiment, the gaming system comprises a game play mechanism operable to place a wager and the outcome evaluator evaluates the outcome based on the wager.

In accordance with a second aspect of the present invention, there is provided a method of gaming comprising:

providing a plurality of display positions in a display area;

selecting a plurality of symbols for display at respective display positions;

determining whether the selected symbols correspond to a winning outcome with reference to at least one of a plurality of defined win lines; and defining each win line so as to comprise at least one display position, at least some of the win lines including differing numbers of display positions.

In accordance with a third aspect of the present invention, there is provided a computer program arranged when loaded into a computer to instruct the computer to operate in accordance with a gaming system comprising:

a plurality of display positions disposed in a display area;

a symbol selector arranged to select a plurality of symbols for display at respective display positions;

an outcome evaluator arranged to determine whether the selected symbols correspond to a winning outcome with reference to at least one of a plurality of defined win lines;

wherein each of the defined win lines comprises at least one display position and at least some of the win lines comprise differing numbers of display positions.

In accordance with a fourth aspect of the present invention, there is provided a computer readable medium having computer readable program code embodied therein for causing a computer to operate in accordance with a gaming system comprising:

a plurality of display positions disposed in a display area;

a symbol selector arranged to select a plurality of symbols for display at respective display positions;

an outcome evaluator arranged to determine whether the selected symbols correspond to a winning outcome with reference to at least one of a plurality of defined win lines;

wherein each of the defined win lines comprises at least one display position and at least some of the win lines comprise differing numbers of display positions.

In accordance with a fifth aspect of the present invention, there is provided a data signal having computer readable program code embodied therein for causing a computer to operate in accordance with a gaming system comprising:

a plurality of display positions disposed in a display area;

a symbol selector arranged to select a plurality of symbols for display at respective display positions;

an outcome evaluator arranged to determine whether the selected symbols correspond to a winning outcome with reference to at least one of a plurality of defined win lines;

wherein each of the defined win lines comprises at least one display position and at least some of the win lines comprise differing numbers of display positions.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
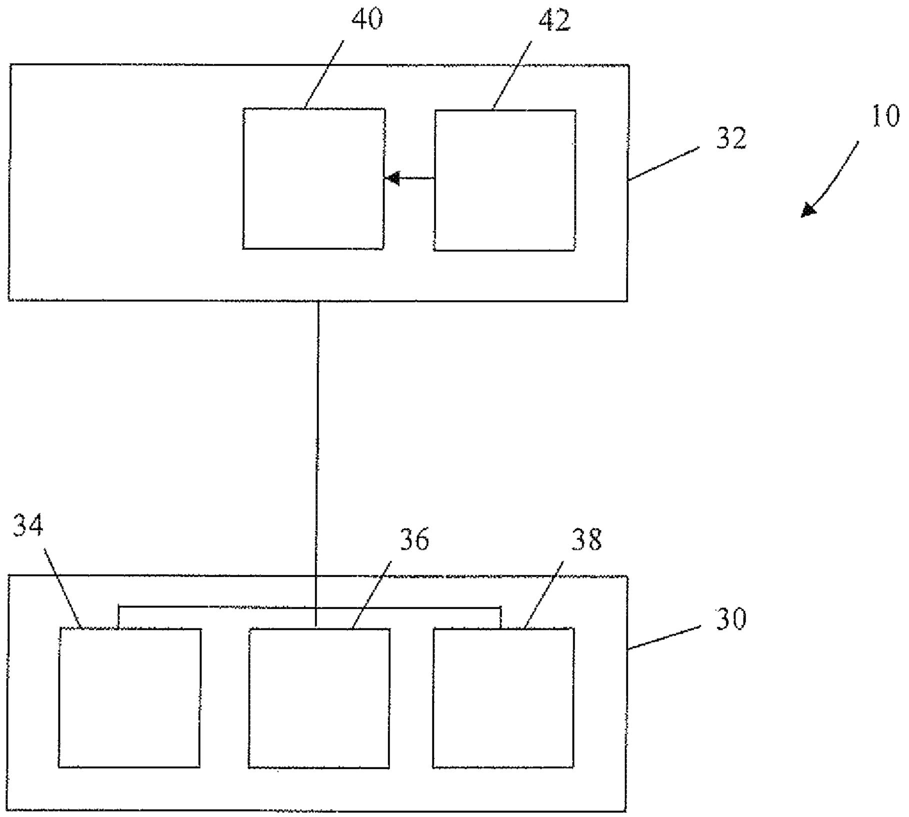
FIG. 1 is a schematic block diagram of core components of a gaming system in accordance with an embodiment of the present invention.

The present gaming system operates such that at least during a portion of a game implemented by the gaming system, a display area is provided including a plurality of display positions. The display positions define a plurality of win lines, some of which have differing numbers of display positions or game matrix coordinates. In this way, win lines comprising differing numbers of display positions/coordinates/symbols are provided which allows different win possibilities to be provided according to the number of display positions in the win lines.

In some embodiments, win lines with differing numbers of display positions are achieved by arranging the display positions so that the display positions together define a generally diamond shaped display area (game matrix), and defining win lines which traverse the display area left to right, right to left or both ways. In other embodiments, the display positions may define a generally square or rectangular shaped display area and win lines defined which extend generally diagonally across the display area.

Referring to the drawings, there is shown a schematic block diagram of a gaming system 10 arranged to implement a probabilistic game of the type wherein several symbols from a set of symbols are randomly displayed, and a game outcome is determined on the basis of the displayed symbols. The system may have a single mode of operation or may be of the type including multiple game modes, such as operable in normal game mode wherein a base game is implemented and special game mode wherein a feature game is implemented.

With some such probabilistic games, the set of symbols used include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

Referring to FIG. 1, a schematic diagram of core components of a gaming system 10 in accordance with the present embodiment is shown. The core components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, one or more displays 36 which may comprise a touch screen, and a game play mechanism 38 arranged to enable a player to input game play instructions.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
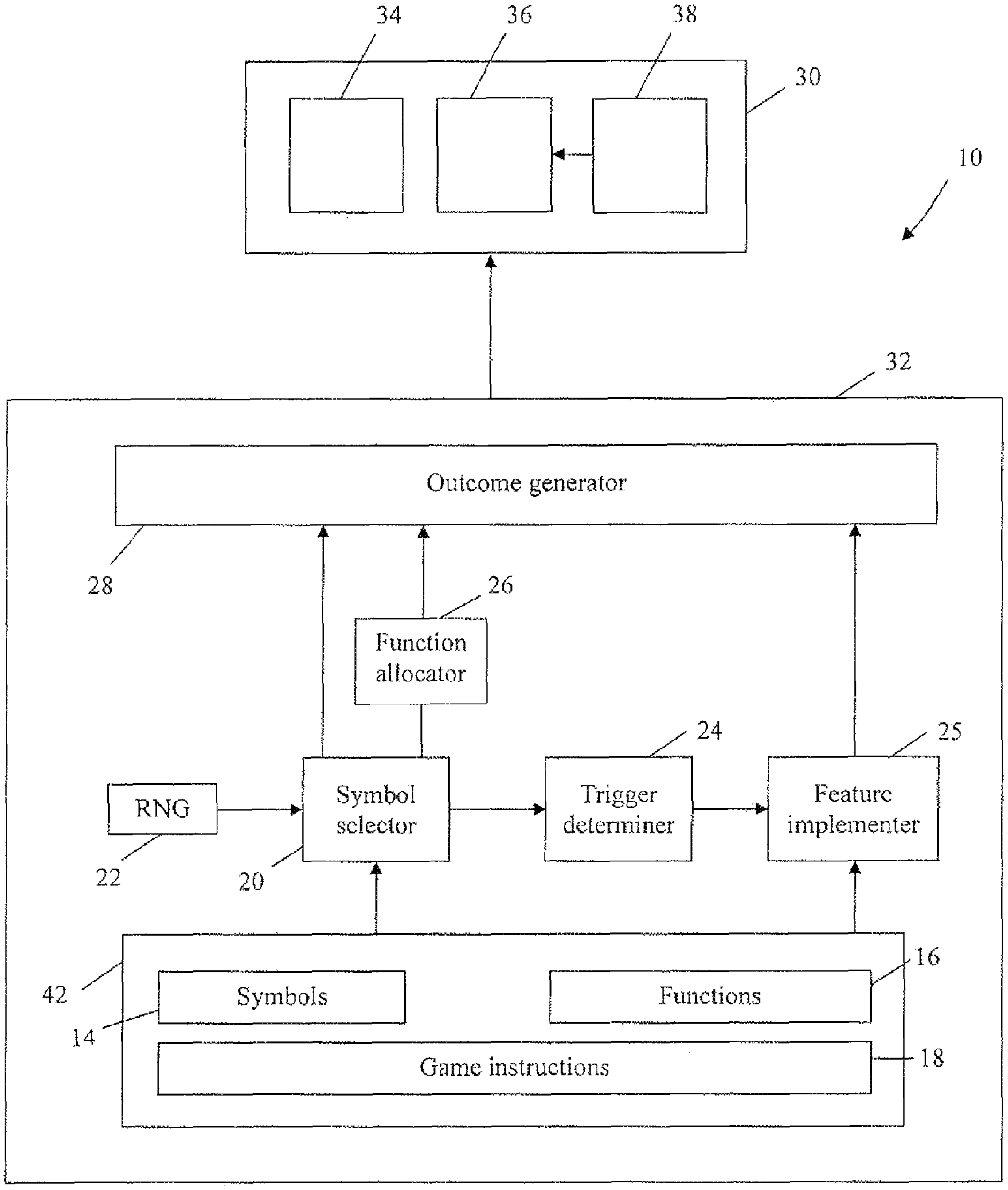
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14 indicative of a plurality of symbols, in the present example associated with a plurality of reels, function data 16 indicative of one or more functions allocatable to the symbols, and game instruction data 18 indicative of game instructions usable by the gaming machine 10 to control operation of the game.

The game controller 32 includes a symbol selector 20 which is arranged to select several symbols from the available symbols 15 for display to a player in a plurality of display positions, in this example by spinning reels containing the symbols and stopping the reels so as to display at least one symbol on each reel. In this example, the selection carried out by the symbol selector 20 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

With this embodiment, the game controller 32 also comprises a trigger determiner 24 arranged to determine whether a trigger condition exists, and a feature implementer 25 arranged to cause the gaming system to operate in special mode wherein a feature game is implemented when a trigger condition exists. Such a trigger condition may be display of a particular symbol or combination of symbols corresponding to a winning combination and the selected identifier 15 in this example is applied to the prize associated with the winning combination so as to increase or decrease the prize, or maintain the prize the same.

The gaming system may also be arranged so as to operate in normal game mode wherein at least one base game is implemented and special game mode wherein at least one feature game is implemented. The trigger determiner 24 may be arranged so as to commence special game mode based on display of a particular symbol or combination of symbols during normal game mode.

In this example, the game controller 32 also comprises a function allocator 27 arranged to select and allocate one or more functions to one or more symbols. Such functions include a wild function, a scatter function, or any other function which may be applied to a symbol or to the game.

The game controller 32 also comprises an outcome evaluator 28 which in accordance with the game instructions 18 determines game outcomes based on the symbols selected for display to the player by the symbol selector 20, and a prize allocator 29 arranged to allocate a prize to a player when a winning outcome exists.

In the embodiments described below, the symbol selector 20, the trigger determiner 24, the feature implementer 25, the function allocator 27, and the outcome evaluator 28, and the prize allocator 29 are at least partly implemented using the processor 40 and associated software, although it will be understood that other implementations are envisaged.

The gaming system 10 can take a number of different forms.

In a first form, a player operable gaming device in the form of a stand alone gaming machine is provided wherein all or most components required for implementing the game are present in the gaming machine.

In a second form, a distributed architecture is provided wherein some of the components required for implementing the game are present in a player operable gaming device and some of the components required for implementing the game are located remotely relative to the gaming device. For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
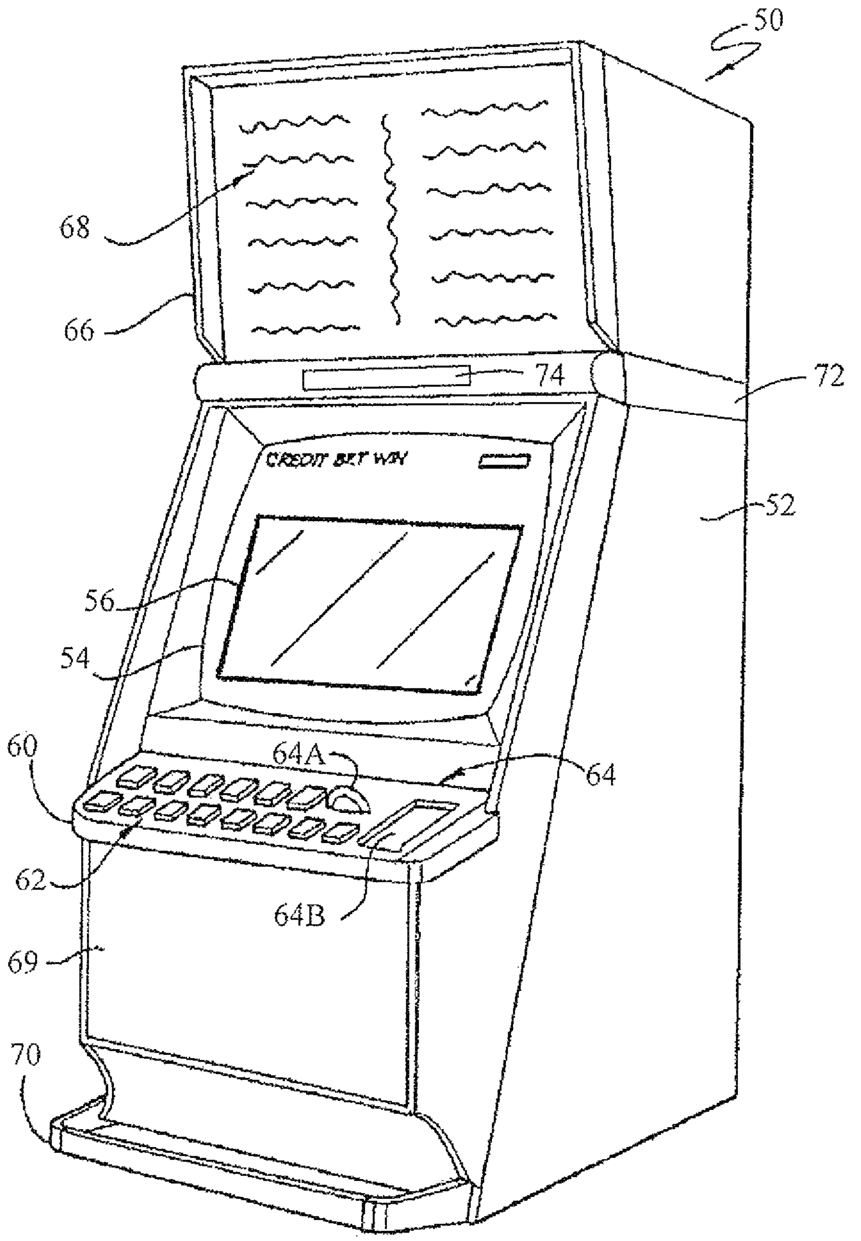
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a display 54 on which is displayed representations of a game 56 that can be played by a player. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The display 54 is in the form of a video display unit, particularly a cathode ray tube screen device. Alternatively, the display 54 may be a liquid crystal display, plasma screen, or any other suitable video display unit. The top box 66 may also include a display, for example a video display unit, which may be of the same type as the display 54, or of a different type. The display 54 may comprise a touch screen usable by a player to interact with the gaming machine, in particular during game play.

The display 54 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
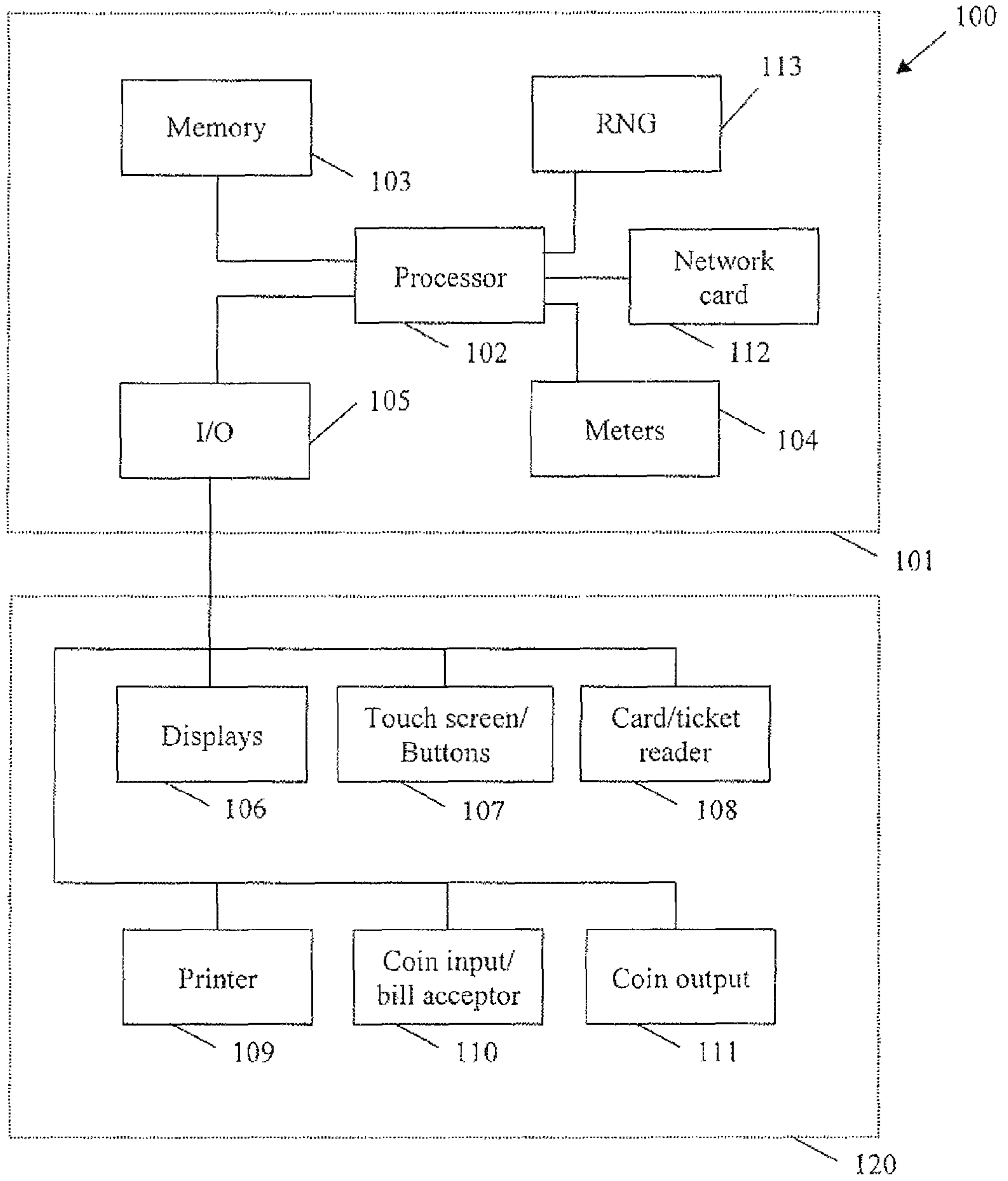
FIG. 4 is a schematic block diagram of operative components of the gaming machine shown in FIG. 3.

FIG. 4 shows a block diagram of operative components of a gaming device 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
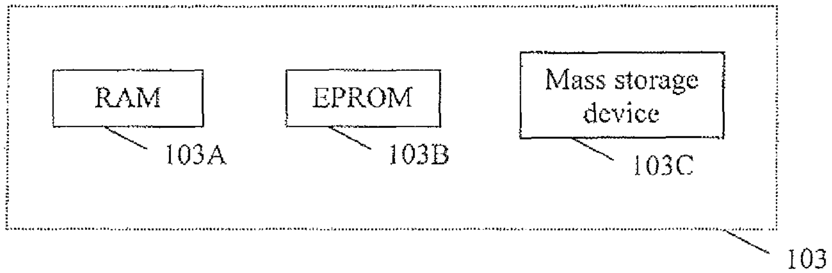
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106, 107, 108, 109, 110, 111 may be provided remotely from the game controller 101.

Figure 6:
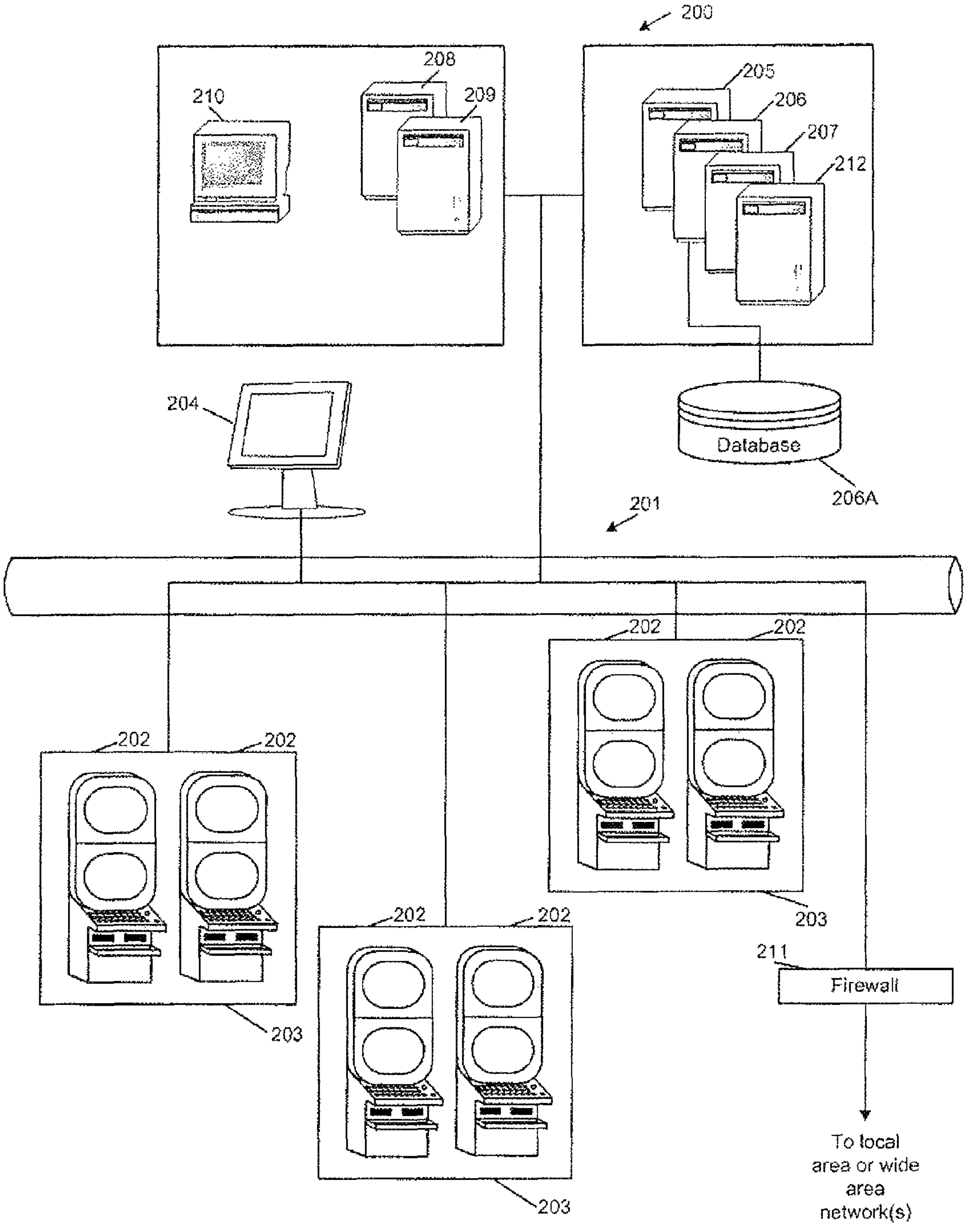
FIG. 6 is a schematic diagram of a gaming system in accordance with an alternative embodiment of the present invention with the gaming system implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40, 100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming device in the form of a gaming terminal 202 and the gaming terminal 202 essentially provides only the player interface. With this embodiment, the game server 205 provides the game controller. The gaming terminal will receive player instructions, and pass the instructions to the game server which will process them and return game play outcomes to the gaming device for display. In a thin client embodiment, the gaming devices could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Examples of specific implementations of the gaming system will now be described in relation to a stand alone gaming machine 10 although it will be understood that implementation may also be carried out using other gaming system architectures such as a network architecture of the type shown in FIG. 6.

In this example, the gaming system is operable in normal game mode and special game mode and the gaming system comprises five reels, each of which has an associated set of symbols.

The reels comprise standard symbols and optionally one or more function symbols and win outcomes are determined on the basis of the symbols visible at the display positions when the reels stop rotating.

Typically, a player will purchase or otherwise obtain win entitlements such as several win lines which are used in the game to determine win outcomes. If the displayed symbols on the reels have symbols associated with a winning combination such as disposed on a win line, the player wins a prize.

The gaming system may be arranged to commence special game mode when a predetermined game outcome occurs, and special game mode may comprise one or more feature games. Special game mode may commence automatically on the basis of a game event occurring during a game such as display of a particular symbol, based on game outcomes determined by the gaming system, or may be prompted by a player pressing a button on the gaming system after the player has identified that a game outcome corresponding to special game mode requirements has occurred.

The gaming system may also be arranged so as to determine eligibility for special game mode, for example based on the amount or type of bet placed, based on certain time periods and so on.

Special game mode may also be arranged to commence when a special game is purchased by a player.

The system and method may also be configured to provide for "scatter" wins for symbols appearing anywhere in the game display matrix.

Figure 7:
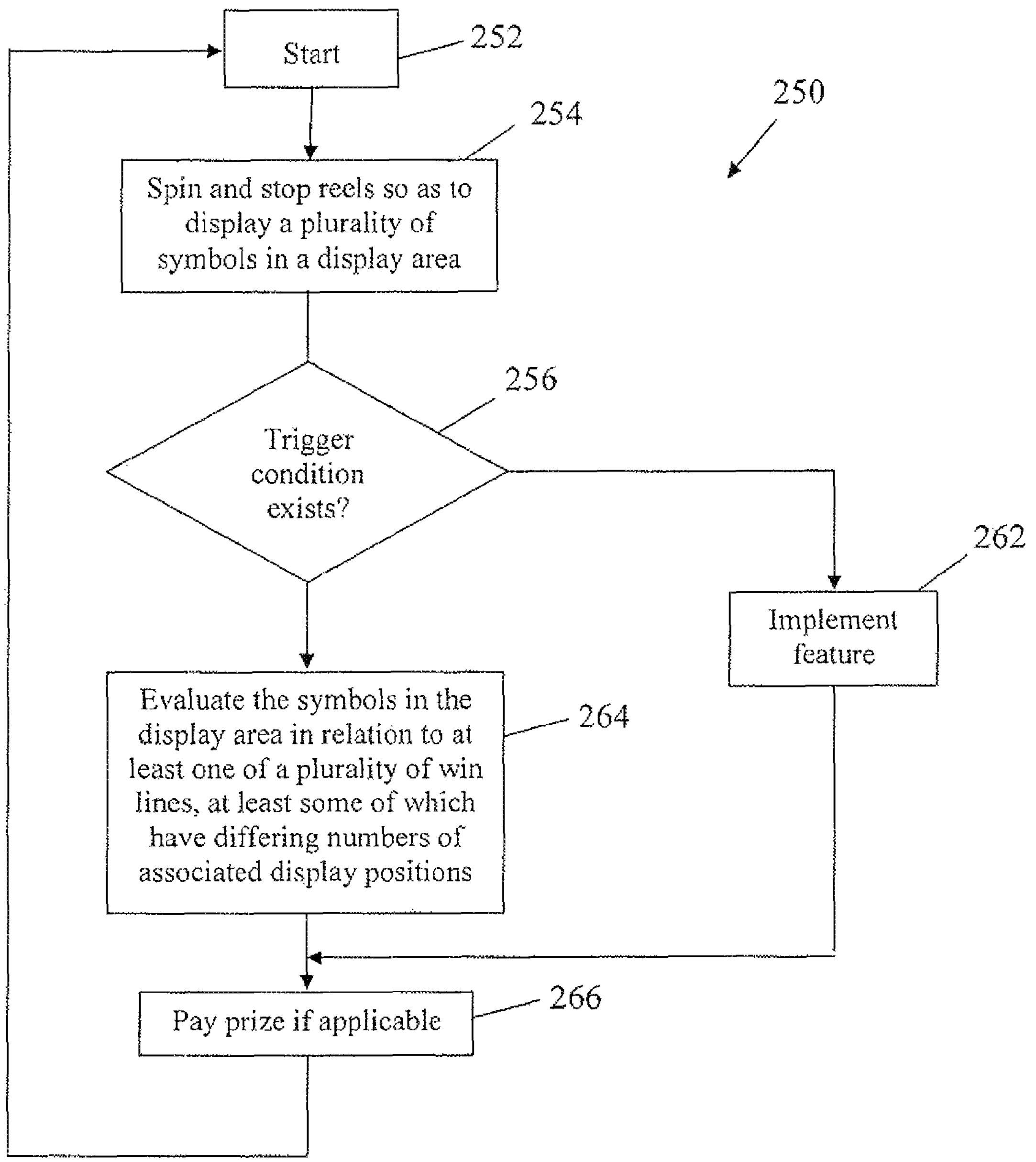
FIG. 7 is a flow diagram illustrating game play of a gaming system in accordance with an embodiment of the present invention.

A specific example will now be described in relation to flow diagram 250 shown in FIG. 7 which illustrates steps 252 to 266 of a method of gaming implemented by the gaming system according to the present embodiment.

Figure 8:
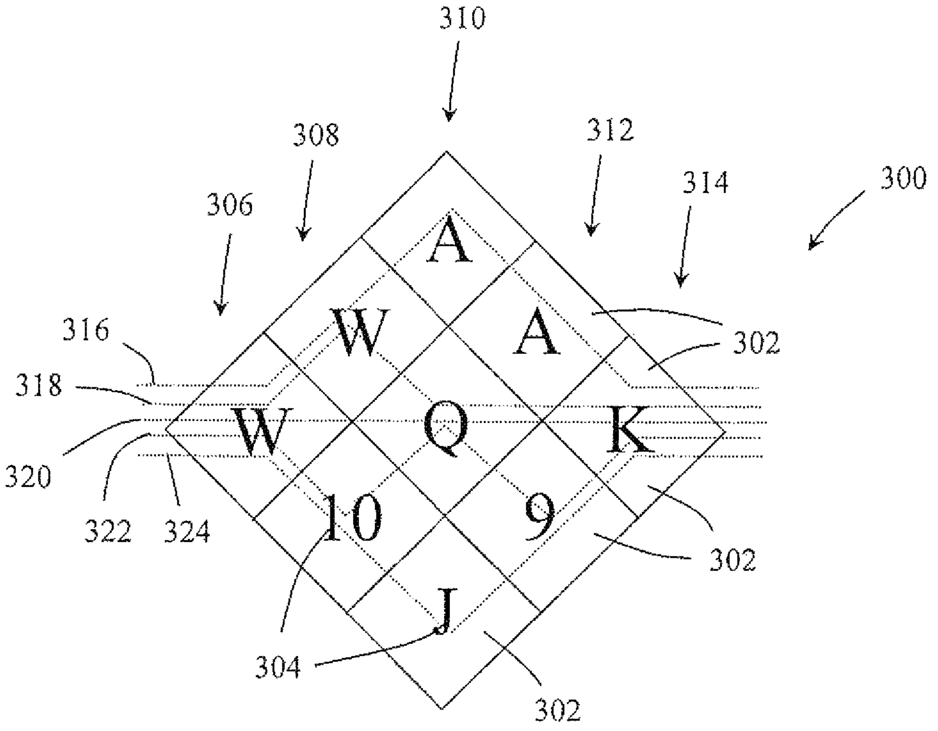
FIG. 8 is a diagrammatic representation of an example display area of a gaming system in accordance with an embodiment of the present invention during implementation of a game.

An example display area 300 of an embodiment of the invention is shown in FIG. 8. In this example, the display matrix includes 9 display coordinates or positions 302 arranged in a generally diamond shaped configuration. Symbols 304 shown in the display positions are arranged in vertically oriented first 306, second 308, third 310, fourth 312 and fifth 314 reels, the first reel 306 having 1 display position 304, the second reel having 2 display positions 304, the third reel 310 having 3 display positions 304, the fourth reel 312 having 2 display positions 304, and the fifth reel 314 having 1 display position 304. In this example, multiple win lines (sometimes called pay lines) are defined, including a first win line 316 having 5 display positions, a second win line 318 having 4 display positions 304, a third win line 320 having 3 display positions 304, a fourth win line 322 having 5 display positions 304, and a fifth win line 324 having 5 display positions 304.

It will be understood that since some win lines have different numbers of display positions, the winning outcomes available will be different for the win lines having 3, 4 or 5 display positions.

Since the win possibilities are different for win lines including 3, 4 or 5 symbols, the gaming system may be arranged such that for example the third win line 320 which comprises 3 display positions is cheaper for a player to purchase than the first win line 316 which comprises 5 display positions. This reflects the greater potential prize that a player could achieve with a 5 display position win line than with a 3 display position win line. Alternatively the award schedule for the second and third win lines 318, 320 may be different because of the diminished number of included display positions. Thus, in one configuration, the award schedule may be configured to offer different awards based upon the number of display positions associated therewith.

In the present example, a winning outcome including 4 ACE symbols (2 WILD (W) symbols and 2 ACE (A) symbols) occurs on the first line 316 and, accordingly, a prize associated with a win comprising 4 symbols on the first line 316 is awarded to the player. The player may also be awarded for 3 Queen (Q) symbols on the second win line 318.

Figure 9:
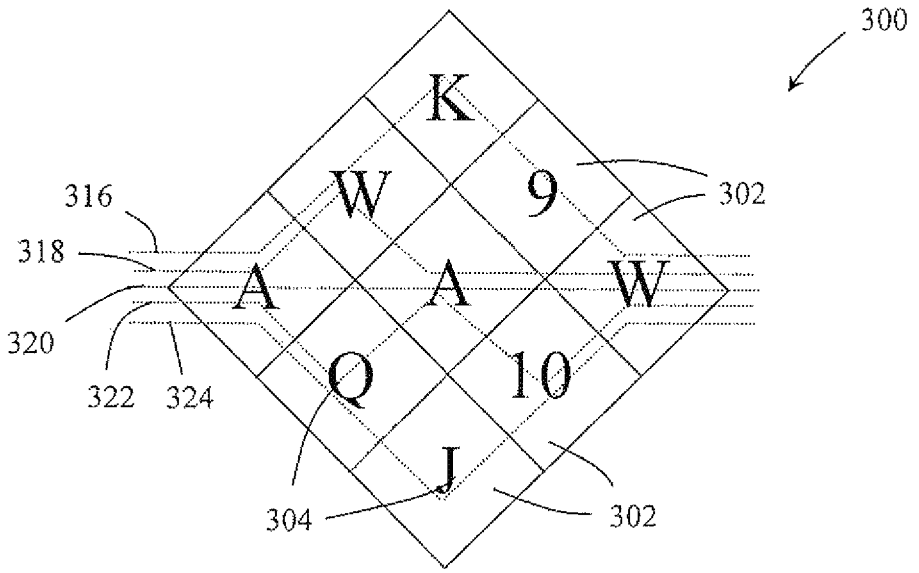
FIG. 9 is a diagrammatic representation of a further example of a display area of a gaming system in accordance with the embodiment shown in FIG. 8.

A further example winning outcome is shown in FIG. 9. With this example, a winning outcome including 3 ACE symbols (2 ACE symbols and 1 WILD symbol) occurs on the third line 320 and, accordingly, a prize associated with a win comprising 3 symbols on the third line 320 is awarded to the player.

Figure 10:
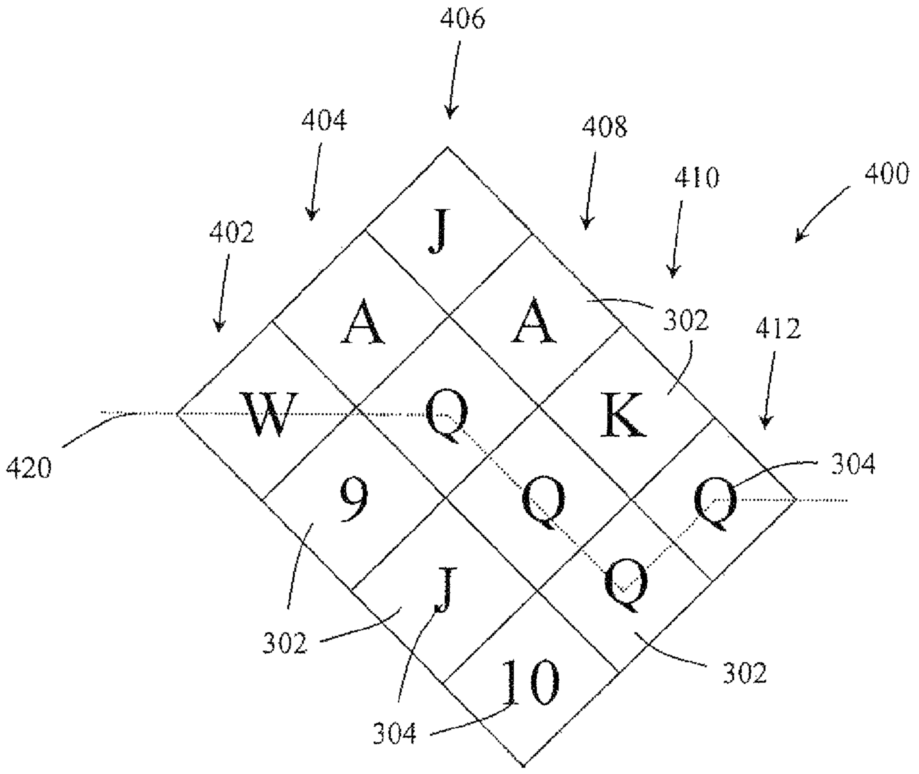
FIG. 10 is a diagrammatic representation of a further example of a display area of a gaming system in accordance with an alternative embodiment of the present invention during implementation of a game.

An example display area 400 of a further embodiment of the invention is shown in FIG. 10. Like and similar features are indicated with like reference numerals. In this example, the display area includes 12 display positions 302 arranged in a generally irregular diamond shaped configuration. Symbols 304 shown in the display positions are arranged in first 402, second 404, third 406, fourth 408, fifth 410 and sixth 412 reels, the first reel 402 having 1 display position 302, the second reel 404 having 2 display positions 302, the third reel 406 having 3 display positions 302, the fourth reel 408 having 3 display positions 302, the fifth reel 410 having 2 display positions 302, and the sixth reel having 1 display position 302. In this example, multiple win lines are defined, some of which include 4 display positions, some of which include 5 display positions, and some of which include 6 display positions.

In the present example, a winning outcome including 5 QUEEN symbols (1 WILD symbol and 4 QUEEN symbols) occurs on a win line 420 and, accordingly, a prize associated with a win comprising 5 QUEEN symbols on the win line 420 is awarded to the player.

Figure 11:
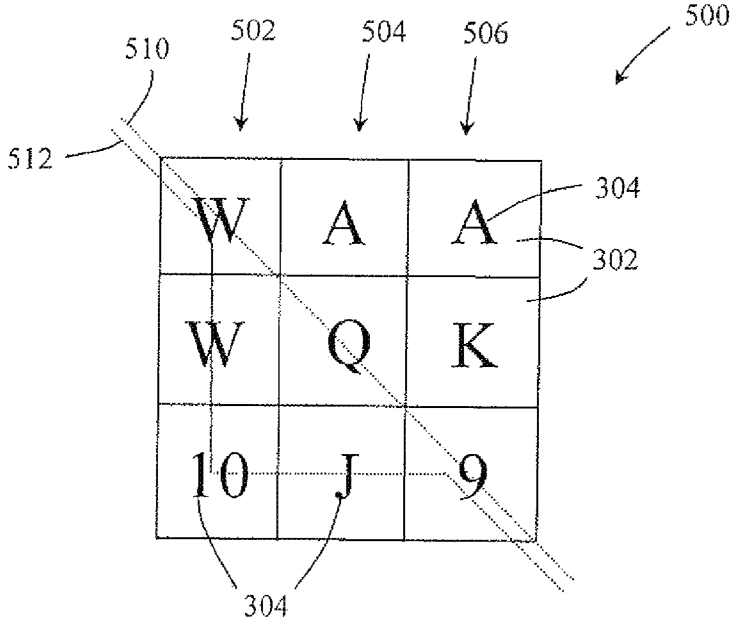
FIG. 11 is a diagrammatic representation of a further example of a display area of a gaming system in accordance with an alternative embodiment of the present invention during implementation of a game.

A further example display area 500 of an embodiment of the invention is shown in FIG. 11. Like and similar features are indicated with like reference numerals. In this example, the display area includes 9 display positions 302 arranged in a generally square shaped configuration. Symbols 304 shown in the display positions are arranged in first 502, second 504 and third reels 506, each reel having 3 display positions 304. In this example, multiple win lines are defined which extend generally diagonally across the display area 400, including a first win line 510 including 3 display positions and a second win line 512 including 5 display positions 304.

As with the above described embodiments, since some win lines have different numbers of display positions, the winning outcomes available will be different for the win lines having 3, 4 or 5 display positions.

In the present example, no winning outcome exists.

Figure 12:
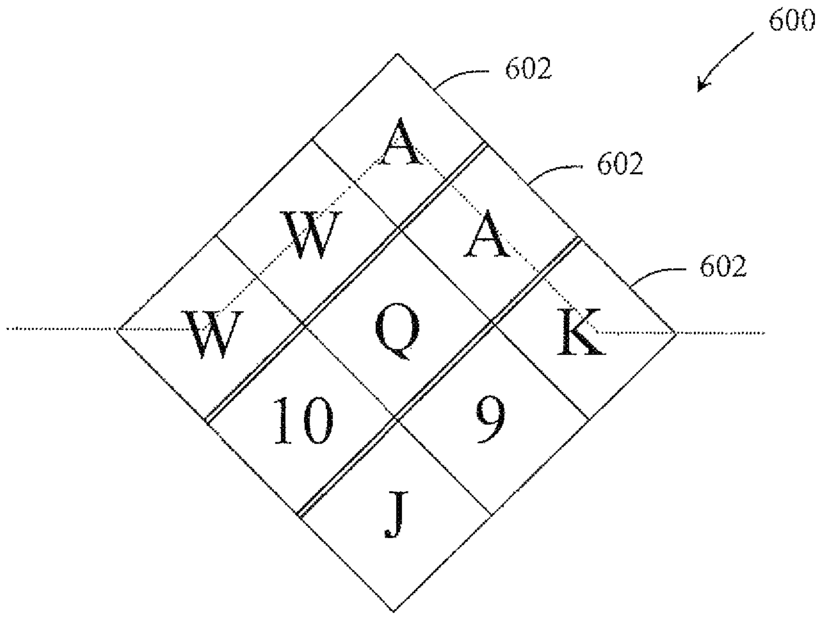
FIG. 12 is a diagrammatic representation of a further example of a display area of a gaming system in accordance with an alternative embodiment of the present invention during implementation of a game.

The above embodiments described in relation to FIGS. 8 to 11 are implemented using a video display such that the symbols, display positions and reel movements are generated on the video display. However, it will be understood that other variations are possible. For example, as shown in FIG. 12, in an embodiment wherein the display positions define a generally diamond shaped display area, several physical, electro-mechanical reels 602 disposed so as to rotate about an inclined axis may be provided.

The gaming system in this example is arranged to operate in normal game mode and special game mode. Special game mode commences when a trigger condition exists and during special game mode at least one feature game is implemented.

The gaming system may be arranged so that a game with multiple win lines, at least some of which have differing numbers of display positions, is implemented during both normal game mode and special game mode or only as part of a feature game during special game mode.

In an alternative arrangement, the gaming system is arranged to operate in normal game mode only. In an alternative embodiment a traditional three reel of five reel base game may be offered with the diamond shaped reels of FIGS. 8-10 and 12 offered during a free spin or second, feature game.

It will be appreciated that while the above embodiments are described in relation to a display area of generally diamond or square configuration, it will be understood that many variations are possible to the extent that any shape display area may be provided, the important aspect being that win lines having differing numbers of display positions are defined.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art, in Australia or any other country.

Modifications and variations as would be apparent to a skilled addressee are deemed to be within the scope of the present invention.

The invention claimed is:

1. A gaming system for playing a game, the gaming system comprising:

a player interface configured to receive an input from a player;

a video display having a predefined number of display positions;

a plurality of display groups each formed from a number of said display positions, at least two of said display groups having different numbers of said display positions, and wherein each said display group is associated with a reel of symbols;

a symbol selector configured to select for display at each of said predefined number of display positions of each group a symbol from a corresponding reel of symbols in accord with the player interface having received an input; and an outcome evaluator configured to determine whether the displayed symbols at respective display positions correspond to a winning outcome of said game with reference to a plurality of predefined win lines, each of said win lines being defined by a number of display positions through which the win line passes including at least two display positions; and wherein a first win line of the plurality of win lines traverses each of the plurality of display groups at least once passing through a display position of each of the display groups, and a second win line of the plurality of win lines traverses a) a first display group at least once passing between display positions of the first display group and b) a second display group at least once passing through a display position of the second display group; and wherein at least two of the plurality of predefined win lines are defined by a different number of display positions through which the respective win line passes; and wherein at least one predetermined win line extends generally diagonally across the display.

2. A gaming system as claimed in claim 1, wherein the display positions are disposed in a display area, and wherein at least one symbol from each reel is viewable through the display area.

3. A gaming system as claimed in claim 2, wherein the reels are disposed so as to be rotatable about an inclined axis.

4. A gaming system as claimed in claim 3, wherein the reels are rotatable about an axis disposed less than forty-five degrees relative to horizontal.

5. A gaming system as claimed in claim 1, and wherein said game has a normal mode and a special game mode, and wherein in said normal game mode, said game comprises at least one base game, and wherein in said special game mode, said game comprises at least one feature game, and said win line in the feature game comprising differing numbers of display positions.

6. A gaming system as claimed in claim 5, and further comprising a game controller configured to commence said special game mode when a specific game outcome occurs.

7. A gaming system as claimed in claim 6, and wherein said game controller is configured to commence said special game mode on said video display of a particular symbol, in response to a player input, based on the amount or type of bet placed, or when a special game is purchased by a player.

8. A gaming system as claimed in claim 1, and further comprising a game play mechanism configured to receive a wager, and wherein said outcome evaluator evaluates the outcome based on said wager.

9. A method of gaming for use with a gaming system playing a game, and having a player interface configured to receive an input, a gaming controller and a display device including a predefined number of display positions, the method comprising:

displaying on said display device a plurality of display groups each having a number of said display positions, at least two of said display groups having different numbers of said display positions, and wherein each said display group is associated with a reel of symbols;

selecting via the gaming controller for display at each of said predefined number of display positions of each group a symbol from a corresponding reel of symbols in accord with the player interface having received an input;

forming a plurality of predefined win lines, including forming each of a first win line from at least two display positions through which the first win line passes and forming a second win line of the plurality of win lines to traverse a) a first display group at least once passing through a display position of the first display group and b) a second display group at least one passing between display positions of the second display group, forming at least two of the plurality of predefined win lines by a different number of display positions through which the respective win line passes; and wherein at least one of the plurality of predefined win lines extends generally diagonally between a plurality of display positions;

displaying said selected symbols at respective display positions; and determining whether the displayed symbols at respective display positions correspond to a winning outcome of said game with reference to said at least one win line.

10. A method as claimed in claim 9, and wherein said reels comprise a plurality of physical reels, each physical reel having an associated set of symbols, and at least one symbol from each physical reel being viewable through said display position.

11. A method as claimed in claim 10, and further comprising disposing said physical reels so as to be rotatable about an inclined axis.

12. A method as claimed in claim 11, and further comprising disposing said physical reels so as to be rotatable about an axis disposed less than forty-five degrees relative to horizontal.

13. A method as claimed in claim 12, and wherein said game has a normal mode and a special game mode, and wherein in said normal game mode, said game comprises at least one base game, and wherein in said special game mode, said game comprises at least one feature game, and said win line in the feature game comprising differing numbers of display positions.

14. A method as claimed in claim 13, and further comprising commencing said special game mode when a specific game outcome occurs.

15. A method as claimed in claim 14, and further comprising commencing said special game mode on display of a particular symbol, in response to player input, based on the amount or type of bet placed, or when a special game is purchased by a player.

16. A method as claimed in claim 9, and further comprising receiving a wager via a game play mechanism; and generating said outcome based on said wager.

17. A gaming system as claimed in claim 1, wherein the video display has a generally square or rectangular configuration.

* * * * *